Jan. 23, 1968  G. J. SWEENEY ET AL  3,364,839
AIR DIFFUSERS

Filed May 1, 1967  2 Sheets-Sheet 1

INVENTORS
GEORGE J. SWEENEY
ROCCO R. BORZONE

ATTORNEY

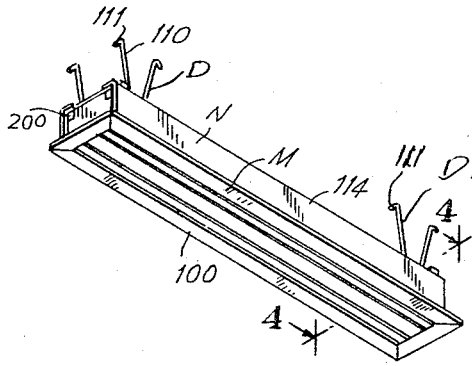
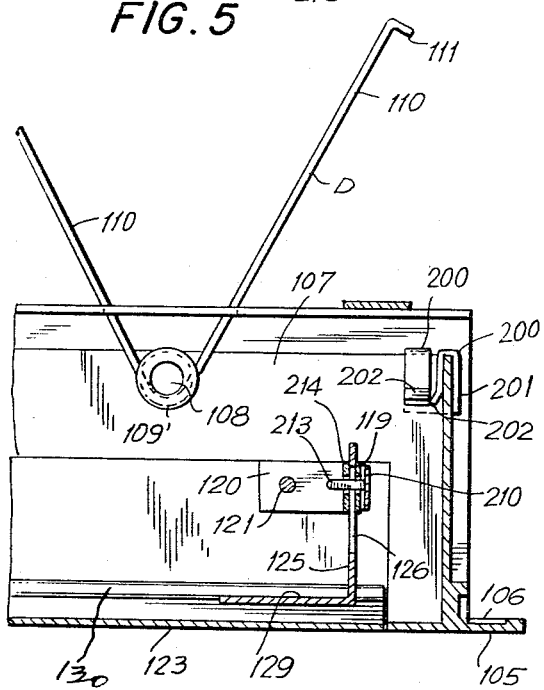
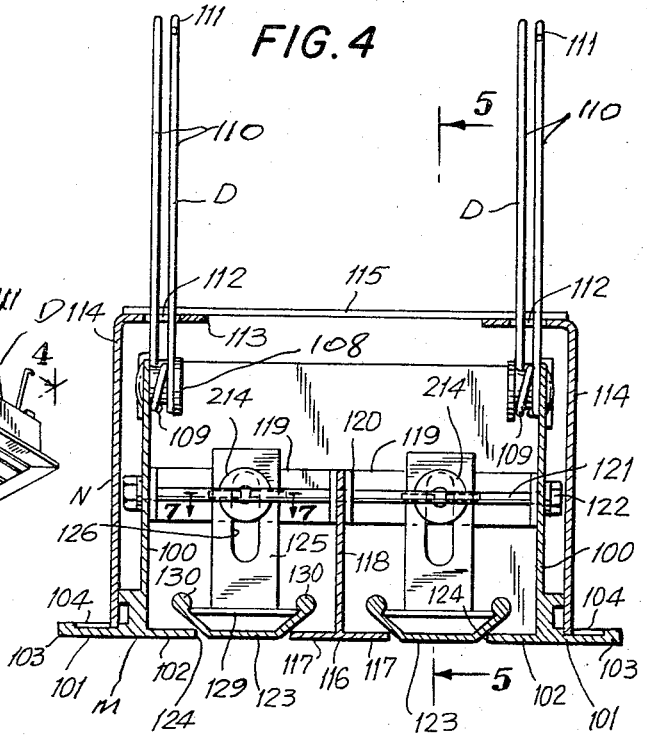
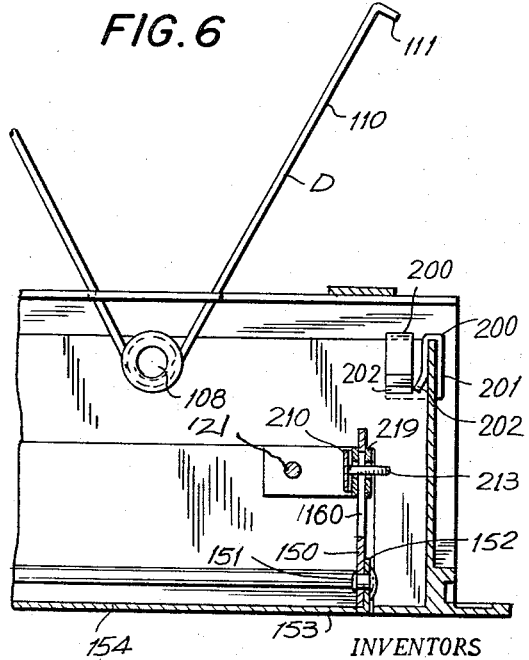
INVENTORS
GEORGE J. SWEENEY
ROCCO R. BORZONE
BY
ATTORNEY

United States Patent Office 3,364,839
Patented Jan. 23, 1968

3,364,839
AIR DIFFUSERS
George J. Sweeney, Port Washington, N.Y., and Rocco R. Borzone, Emerson, N.J., assignors to Air Devices, Inc., New York, N.Y., a corporation of New York
Filed May 1, 1967, Ser. No. 635,198
7 Claims. (Cl. 98—40)

ABSTRACT OF THE DISCLOSURE

The disclosure describes an elongated air diffuser having a plurality of parallel channels formed by inverted T-shaped separators, each of which may be equally spaced from one another. Normally, two or more of these passages may be employed and they may be held in a ceiling or in another type of support by means of V-shaped spring latch members. The flow of air outwardly through each channel is controlled by the control members of dished shape, which may be manually or otherwise moved to one side or elevated or depressed to permit flow through the full width of the channel, or the flow may be closed off over the full width of the channel.

---

The present invention relates to an air diffuser and it particularly relates to an elongated diffuser which may be utilized for placement in ceilings of rooms to control the entry of incoming heating, cooling or ventilating air.

Although not limited thereto, the present invention will be particularly described in its application to an elongated diffuser construction in which lengths thereof may extend across the ceiling of a room, or wall to wall thereof, or over any predetermined length or distance, with a series of parallel slotted air release openings which will control the flow of air through these slots.

It is among the objects of the present invention to provide an elongated air diffuser construction which will comprise one or more rows of parallel slots, the discharge through which will be readily controlled, and may be made in any desired lengths.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In accomplishing the above objects it has been found most satisfactory to form a device of side and under frames of uniform extruded cross-section, joined at the corners by mitered joints which may be clipped or keyed together at the corners so as to form a rectangular frame. Within this elongated rectangular frame having inwardly extending side and end walls there are positioned a series of inverted T-shaped separator members forming a series of slots, each of which are partly restricted by the head of the T's extending inwardly to limit the opening in the slots.

The T heads are desirably flush with the outstanding side flanges of the frame which extend along and contact the exterior face of the ceiling. Within each T slot there is positioned a rocker member for controlling the amount and direction of flow of air therethrough. These rocker members may consist of curved or beveled members which may be moved into or out of the slot to give a greater or lesser flow through the slot, or which may be moved from side to side to open or close or divert a greater or lesser portion of air through one side of the slot and then the other side of the slot.

These members are desirably fixedly mounted at their ends on cross elements which extend between the side frames and the stems of the intermediate T bars, and at their ends they may be provided with a friction pivotal connection so that they will retain an upper or lower adjusted position, together with an adjusted lateral position.

With the foregoing and other objects in view the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

FIG. 1 is a transverse sectional view of one form of diffuser, according to the present invention.

FIG. 2 is a transverse sectional view upon the line 2—2 of FIG. 1, upon an enlarged scale as compared to FIG. 1.

FIG. 3 is a bottom perspective view of an alternative of diffuser with two channels as it would be inserted into a ceiling.

FIG. 4 is a transverse sectional view upon the line 4—4 of FIG. 3, upon an enlarged scale as compared to FIG. 3.

FIG. 5 is a fragmentary transverse vertical sectional view upon the line 5—5 of FIG. 4.

FIG. 6 is a fragmentary transverse sectional view of still another embodiment similar to FIG. 5.

FIG. 7 is a transverse sectional view upon an enlarged scale showing the end attachment of the swinging member, as illustrated in FIG. 5.

Referring to FIGS. 1 and 2, there is shown the side frames A having the inward extensions B with the outwardly extending flanges C fitting under the ceiling diffuser D. Between the side frames A there are positioned the intermediate inverted T-bars E, which are shown as four in number, and which provide for five outlet slots F. However, it is understood that any number of slots may be provided for, from one to five or ten, with a preferential minimum of two, three or four.

Between the side walls B there extends the cross frame G, which also may be mounted on the T bars E and which may serve to hold them in position. By means of the pivot mounts H, the swinging, retractable and extensible control members J are provided, which have the lower dish plates K and the slotted arms L which extend up to and engage the friction pivots H.

Referring specifically to the side members A with the inturned, inwardly directed walls B and the outstanding flanges C, the interior portions 20 of the walls B may be connected with an interior conduit system indicated at 21 by means of suitable connections. These walls B may carry, by snap connections or by screw, nut and bolt connections 22, the ends of the cross members G.

This mounting member G may also be connected at 24 to the inturned stems 25 of the inverted T bars E. The screw members 26, which may be replaced by rivets, extend through the cross bar G and screw into the resilient or spring friction plates 27 by their threaded portions 28 and have contact heads 28 which engage the legs 29 of the swinging members J.

The slotted arms L have flange portions 30 which are riveted or screwed at 31, to the base 32 of the elongated dish member K, which has obliquely outwardly and upwardly extending portions 33 terminating in the rounded contact elements 24. By tightening the screws 28 as against the spring washers or discs 27, it is possible to achieve any desired amount of friction on the slotted elements L so as to hold them into the various adjusted positions shown in FIG. 1.

As shown in FIG. 1, the dish element K is moved to the left, with the knob 34 contacting the interior face of the left wall or flange B. This will retard or stop passage outwardly of or through the slot F and limit the flow to the space indicated at 35. To permit maximum flow, the dish element K is forced inwardly, as indicated in the second slot from the left in FIG. 1, with air then flowing through both side openings 36, out through the slot F.

In the middle position shown in FIG. 1, the dish element K is moved inwardly away from the outlet of the slots F and moved to the right, with the result that there will be a reduced flow through the opening 37 and a maximum flow through the opening 38.

The next slot, which is second from the right, shows the means of closing the slot F altogether. In this case the oblique portions 33 are directly in contact with the edges 39 of the outstanding flanges 40 of the inverted T members E, which will result in substantially all air being cut off which might otherwise flow outwardly through this slot F.

The last slot shown in FIG. 1 indicates the base 32 of the dish member K contacting the edge 39 of the flange 40, closing off all flow of air through the right hand side of the slot, but permitting a limited flow through the left hand side of the slot.

Thus it is possible to obtain a wide range of adjustments by inserting a tool or hand between the flanges 40 and moving or lowering the swinging members J to any desired adjusted position as indicated in FIG. 1. The side walls 20 carry the outwardly projecting integral elements 60 and 61, forming recesses 62 which can receive connection keys. The element 61 can also act as a stop for the edge of the wall or ceiling bevel D. The recess 63 may serve to receive sealing means to prevent escape of air around the frame elements B.

In the alternative form of frame as shown in FIG. 3, the outside frame 64 may have the inwardly projecting portion 65 to receive a spring clip 66. It may also have the inwardly projecting right angular portions 67 to form a slot 68 for receiving connecting keys at the corners thereof.

The projecting portion 69 may fit into the ceiling structure or act to form a recess with the downwardly projecting portion 70 to receive the corner of a ceiling panel. The interior member 71, which may be removable and serve to carry the various T members J and swinging dish members K, may be provided with a side wall 72 carrying the attachment 73 for the spring clip 66. The cross rod 74, with the attachment nut 75, will hold the stems 25 of the T members in position.

The lower end of the side frame 71 may carry the T head 76, the outside portion of which has the projections 77 and 78 to form a slot or recess 79 to receive corner connections. The edge 80 will contact the lower end 81 of the outside flange and the unit 71 may then be removed.

Referring to FIG. 3, there is shown a frame 100 having the side flanges M and the receptacle portion N which is received in a recess in the ceiling. The V-shaped spring clips 110 for holding the device in the ceiling have the outturned end portions 111.

Referring to the more detailed showing of FIGS. 4, 5 and 7, the detachable structure 100 has the outside walls which carry the outwardly extending flanges 101 which terminate at 103 in contact with the face of the ceiling. The recesses 104 may receive sealing means, such as gaskets, and they also may receive the lower ends of the receptacle structure having the side walls 114 and the inturned upper walls 114 and the inturned upper walls 113, which fit within the recess in the ceiling.

These upper walls 113 have slots 112 through which project the legs of the V-shaped spring holder members D. The lower ends of the V-shaped members D are coiled at 109 around the studs 108, which are mounted on the side walls 100 of the receptacle structure N. The inturned flanges 102, as shown in FIG. 4, serve as one-half inverted T-heads with a central complete T-head 116 being shown in the center of FIG. 14. The central T-head 116 has the outwardly extending flanges 117 to match the half T-head flanges 102 and form channels through which the incoming conditioning or ventilating air may flow outwardly.

The swinging members 123 have a flat bottom face and obliquely upturned side portions terminating in the longitudinal edge beads 130 which are joined together by means of the cross-members 129 at their ends. The oblique portions are designed to cooperate with the edges 124 formed by the T-head elements 102 and 117 to control the flow of air out through the slots.

These dished swinging members 123 are provided with the upwardly extending end pivotal members 125 slotted at 126 and held by the spring disc assemblies 214 against the cross-bar 119 which extends between the vertical legs 118 and 100 of the T-members, as shown in FIG. 4. These cross-members 119 have the flanges 120 against the vertical structures 100 and 118 and they are all held together by means of the rod 121 extending through the structure and having the nuts 122 at its ends.

Referring to FIG. 7, it will be noted that the spring disc assemblies 214 consist of a spring disc member 210 having the slot 211 with the inwardly turned portions 212 having the widened legs 213. These legs extend through openings in the cross-bar 119 in the vertical member 125 and in the washer 125a. These spring disc members will hold the vertical members 125 frictionally against any slippage or movement after the dished elements 123 have been adjusted in position to close off the slots as indicated in FIG. 4 or to adjust the flow out of the slots in the various positions shown in FIG. 1.

For example, the second slot from the left shows the full open position, whereas the second slot from the right shows the full closed position in FIG. 1. In the intermediate positions the right hand slot is open on the left but closed on the right and the reverse is true in connection with the position of the element K in the slot on the extreme left in FIG. 1. In the middle slot the flow has been deflected to the left side of the slot, with a lesser flow through the right side of the slot.

Referring particularly to FIG. 5, the dished adjustable member 23 is engaged at its ends by the plate 129, which is lodged under the beads 130. The plate 129 has an upturned slotted end portion 125 with a slot 126 which receives the legs 213 of FIG. 7. The rod 121 will extend across and through the walls of the slots, as well as through the flanges 120 of the members 119. The resilient clips 200, with the inturned portions 202 of the outer legs 201, will fit over the upper ends of the walls 107.

In the embodiment of FIG. 6, the disc 210 is shown on the inside of the upstanding leg 150 having the slot 160. The cross-member 219 extends on the outside face of the leg 150. The rivet 151 will hold the leg in position on the end flange 152 turned up from the bottom 153 of the dished member 154.

It is thus apparent that the applicants have provided a slotted diffuser in which the various slots may be individually adjusted, whether one, two or more in number, so as to control the flow and direction of air passing therethrough for ventilating and air conditioning purposes. There is provided a simple, readily controlled slotted ventilating, conditioning or heating and cooling air flow unit, for use in ceilings, which can be most readily adjusted to various conditions and in accordance with the desires of the occupants of the room.

As many changes could be made in the above air diffuser, and many widely different embodiments of this invention could be made without departing from the scope of the claims, it is intended that all matter contained in the above description shall be interpreted as illustrative and not in a limiting sense.

Having now particularly described and ascertained the nature of the invention, and in what manner the same is to be performed, what is claimed is:

1. An elongated slot ceiling diffuser comprising an elongated rectangular frame having an interior inlet side and an exterior outlet side and having a plurality of parallel narrow slots extending the length of the diffuser, said elongated frame having spaced apart side frame members taking the form of inverted T-sections with vertical stems, inverted T-shape dividers spaced between said side frame members having T-heads all in substantially the same plane and substantially in the plane of the ceiling with upwardly extending vertical stems, transverse connecting and support members extending between and attached to the inlet sides of stems of the T-sections of the frame members and the inlet sides of the stems of the T-shaped dividers, an elongated downwardly dished shaped flow regulating member, positioned above each slot and below the support members and between the stems, and each said member having a relatively horizontal bottom portion and upwardly inclined side portions, said relatively horizontal bottom being narrower than the width of the slot between the heads of the T-sections and said dished shaped member as a whole being wider than the slot, upwardly extending support members mounted on the interior side of said relatively horizontal bottom portion and extending vertically upwardly between the stems to the transverse members and mounting means connecting the upwardly extending support members at their upper ends to said transverse support members and permitting sliding and pivotal movement and adjustment of said regulating member toward and away from said T-heads to regulate the flow out through said slots and means to retain said regulating member in adjusted position.

2. The diffuser of claim 1, said last mentioned means to retain consisting of a spring contact member positioned between the upwardly extending support member and the transverse support member.

3. The diffuser of claim 1, said upwardly extending support members being provided with vertical slots and said transverse support members being provided with transverse elements extending through said slots and engaging said slots and permitting movement of said slots.

4. The diffuser of claim 1, the edges of said T-heads forming said slots and also forming contact portions for the inclined side portions of the regulating member so that the slots may be cut off, either at one side or the other or at both sides.

5. The diffuser of claim 1, the outer edges of said regulating members being beaded and said beaded portions contacting the lower sides of said stems when flow is cut off along said side of said stem.

6. The diffuser of claim 1, the outside edges of said regulating members being beaded and said upwardly extending support portions having horizontal members fitted under and attached under said beads to said regulating member.

7. The diffuser of claim 1, said upwardly extending support members taking the form of an L-shaped member having a lower horizontal flange attached to said relatively horizontal bottom and a vertical extension having a central slot and said slot serving as said mounting means.

References Cited

UNITED STATES PATENTS

| | | | |
|---|---|---|---|
| 3,064,550 | 11/1962 | O'Day et al. | 98—40 |
| 3,185,069 | 5/1965 | Straub et al. | 98—40 |
| 3,194,145 | 7/1965 | Robertson | 98—40 |
| 3,260,188 | 7/1966 | Person | 98—40 |
| 3,276,348 | 10/1966 | Kennedy | 98—40 |
| 3,327,608 | 6/1967 | Newell et al. | 98—40 |

ROBERT A. O'LEARY, *Primary Examiner.*

W. E. WAYNER, *Assistant Examiner.*